United States Patent
Daehler et al.

(10) Patent No.: US 10,910,178 B2
(45) Date of Patent: Feb. 2, 2021

(54) PARTICLE EXTRACTION SYSTEM FOR AN INTERRUPTER

(71) Applicant: ABB Power Grids Switzerland AG, Baden (CH)

(72) Inventors: Christian Daehler, Greensburg, PA (US); Jeffrey H. Lange, New Stanton, PA (US); Mark Licastro, Latrobe, PA (US)

(73) Assignee: ABB POWER GRIDS SWITZERLAND AG, Baden (CH)

(*) Notice: Subject to any disclaimer, the term of this patent is extended or adjusted under 35 U.S.C. 154(b) by 0 days.

(21) Appl. No.: 16/599,750

(22) Filed: Oct. 11, 2019

(65) Prior Publication Data
US 2020/0043685 A1 Feb. 6, 2020

Related U.S. Application Data

(60) Division of application No. 15/908,142, filed on Feb. 28, 2018, now Pat. No. 10,483,059, which is a
(Continued)

(51) Int. Cl.
*H01H 11/00* (2006.01)
*H01H 33/56* (2006.01)
(Continued)

(52) U.S. Cl.
CPC .......... *H01H 33/565* (2013.01); *H01H 11/00* (2013.01); *H01H 33/30* (2013.01);
(Continued)

(58) Field of Classification Search
CPC ...... H01H 33/565; H01H 33/56; H01H 33/57; H01H 33/30; H01H 1/36; H01H 1/48; H01H 71/66; H01H 11/00; H02B 3/00
(Continued)

(56) References Cited

U.S. PATENT DOCUMENTS 3,214,553 A 10/1965 Leeds
3,309,482 A * 3/1967 Leeds .................... H01H 33/57
218/43
(Continued)

FOREIGN PATENT DOCUMENTS

KR 200437124 Y1 11/2007

OTHER PUBLICATIONS

International Search Report and Written Opinion, Corresponding Application No. PCT/US2016/048737, dated Jan. 19, 2017, 12 pp.
(Continued)

*Primary Examiner* — William A Bolton
(74) *Attorney, Agent, or Firm* — Sage Patent Group

(57) ABSTRACT

A particle extraction system for an electrical interrupter is disclosed in the present application. The particle extraction system includes a support bay configured to hold an electrical interrupter in position during a particle extraction event. An actuator system is operable for cycling the interrupter to dislodge and release foreign particles internal to the interrupter. A fluid source and pumping system is in fluid communication with at least one internal flowpath within the interrupter to entrain and transport the released particle from the interrupter. A vacuum slot is operable for receiving a fluid flow with entrained particles and transporting the particles to a particle capture device.

15 Claims, 6 Drawing Sheets

Related U.S. Application Data continuation of application No. PCT/US2016/048737, filed on Aug. 25, 2016.

(60) Provisional application No. 62/212,011, filed on Aug. 31, 2015.

(51) Int. Cl.
  H01H 33/57 (2006.01)
  H01H 33/30 (2006.01)
  H02B 3/00 (2006.01)

(52) U.S. Cl.
  CPC .......... H01H 33/56 (2013.01); H01H 33/57 (2013.01); H02B 3/00 (2013.01)

(58) Field of Classification Search
  USPC ........ 218/84, 83, 85, 97, 155, 157; 361/226, 361/233; 174/14 R; 200/19.25, 301
  See application file for complete search history.

(56) References Cited

U.S. PATENT DOCUMENTS

| | | | |
|---|---|---|---|
| 3,499,129 A | 3/1970 | Hulteen et al. | |
| 3,727,018 A | 4/1973 | Wesoloski et al. | |
| 3,773,994 A | 11/1973 | Beatty | |
| 3,814,879 A | 6/1974 | Cookson et al. | |
| 3,852,550 A * | 12/1974 | Bertolino | H01H 33/56 218/68 |
| 3,911,937 A * | 10/1975 | Sletten | H01B 9/0672 134/1 |
| 3,943,315 A | 3/1976 | Taylor et al. | |
| 4,265,646 A * | 5/1981 | Weinstein | F02C 7/052 55/306 |
| 4,336,414 A | 6/1982 | Suzuki et al. | |
| 4,948,397 A * | 8/1990 | Kumar | B01D 46/26 55/290 |
| 5,483,031 A | 1/1996 | Matsuda | |
| 6,307,172 B1 | 10/2001 | Bolin et al. | |
| 6,621,030 B2 * | 9/2003 | Andou | H01H 33/56 218/43 |
| 6,927,355 B2 | 8/2005 | Thuresson et al. | |
| 7,858,877 B2 | 12/2010 | Nowakowski et al. | |
| 3,000,080 A1 | 8/2011 | Krause et al. | |
| 9,269,514 B2 | 2/2016 | Rodrigues et al. | |
| 2008/0053961 A1 | 3/2008 | Grieshaber | |

OTHER PUBLICATIONS

Supplementary European Search Report issued in corresponding European application No. 16842654.2, dated Mar. 4, 2019, 2 pp.

* cited by examiner

PARTICLE EXTRACTION SYSTEM FOR AN INTERRUPTER

TECHNICAL FIELD

The present application generally relates to a particle extraction system and more particularly, but not exclusively, to a particle extraction system for an electrical interrupter.

BACKGROUND

Electrical interrupters are constructed to interrupt electrical power by separating one conductor from another a distance sufficient to prevent electrical arcing between the conductors. The movement of components within an interrupter can cause particle displacement especially during an initial break-in time period. In some instances, displaced particles may at least partially align to provide an electrical pathway sufficient to permit electrical arcing in undesirable locations. A particle extraction system can remove unwanted particles generated though manufacturing processes and certain wear conditions during initial break-in periods. Some existing systems have various shortcomings relative to certain applications. Accordingly, there remains a need for further contributions in this area of technology.

SUMMARY

One embodiment of the present application is a unique a particle extraction system for electrical interrupters. Other embodiments include apparatuses, systems, devices, hardware, methods, and combinations for a particle extraction system. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
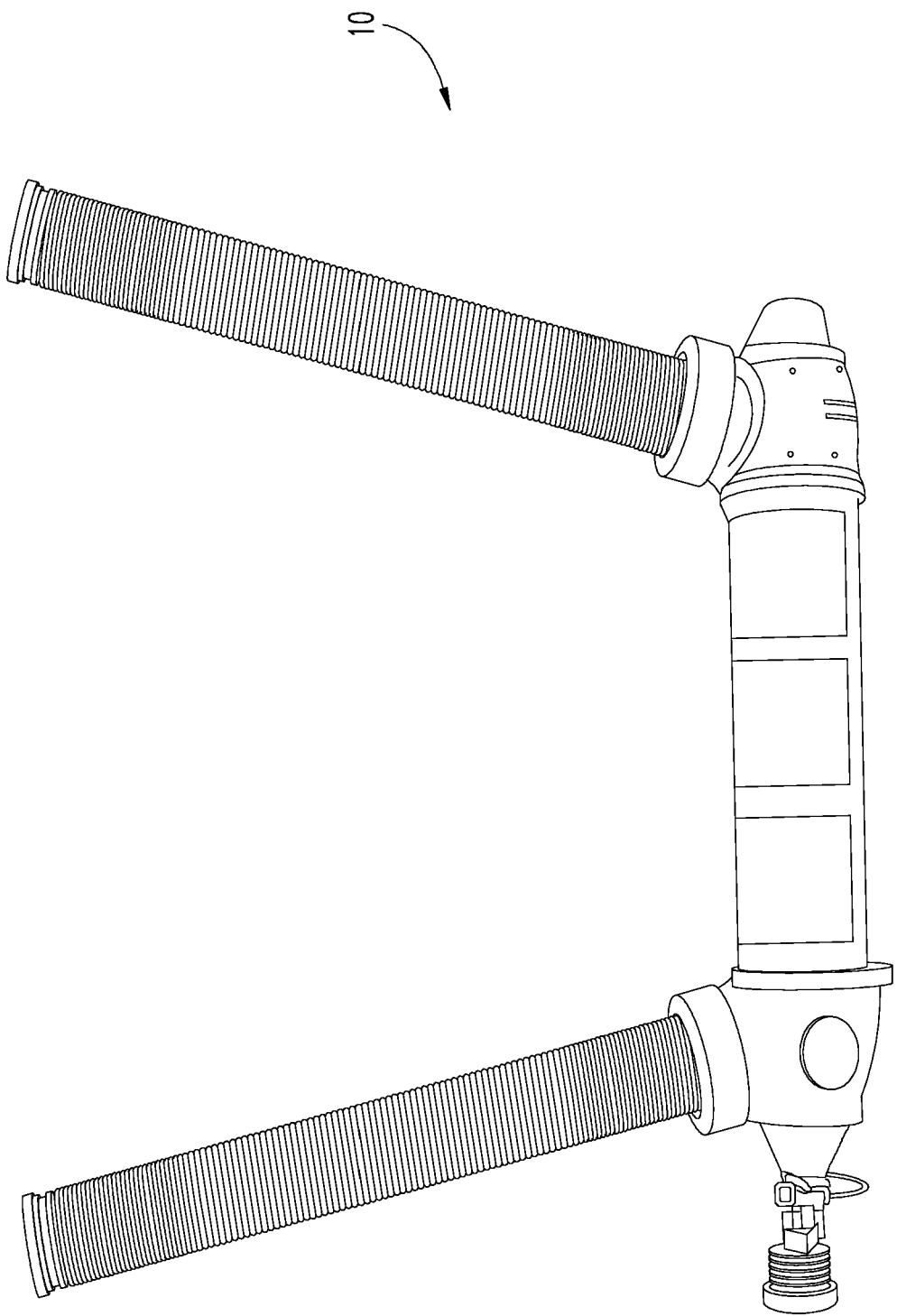
FIG. 1 is a perspective view of an electrical interrupter according to one embodiment of the present disclosure.

For the purposes of promoting an understanding of the principles of the application, reference will now be made to the embodiments illustrated in the drawings and specific language will be used to describe the same. It will nevertheless be understood that no limitation of the scope of the application is thereby intended. Any alterations and further modifications in the described embodiments, and any further applications of the principles of the application as described herein are contemplated as would normally occur to one skilled in the art to which the application relates.

Referring to FIG. 1, an electrical interrupter system 10 is illustrated in one exemplary form. The interrupter system 10 is operable to permit electrical current to selectively flow therethough in a first configuration and prevent electrical current from flowing therethrough in a second configuration. In this manner a portion of an electrical system such as high tension wiring or components in a power station may be isolated from a source of electrical power so that maintenance procedures or the like may be safely accomplished on portions of the system 10.

Interrupters operate by moving a portion of an electrical conductor such that an inlet conductor portion is separated from an outlet conductor portion by a gap or space that is formed at a sufficient distance to prevent electrical arcing from the inlet portion to the outlet portion. The movement of the conductor can generate loose particles through mechanical abrasive wear during a break-in period. A break-in period can include multiple cycle operations over a defined period of time. One illustrative process includes several hundred cycles over a defined period of time. Undesirable particles or foreign matter may also result from manufacturing processes, assembly processes or maintenance processes. These loose particles can move around within the interrupter and in some cases lead to subsequent dielectric failures. Dielectric failure may be caused by the particles becoming charged and inadvertently aligned by an electric field during use or operation of the interrupter. In certain cases, the alignment may form a bridge across a dielectric medium within the gap formed between the inlet an outlet conductors in the interrupter. The dielectric medium can include gases such as an SF6 (sulfur hexafluoride) dielectric gas, ambient air, a vacuum or other dielectric materials as desired. A breakdown in the dielectric medium can result in undesirable arcing between the inlet and outlet conductors or to regions of the system that are at different electric potentials, e.g., regions at transmission voltage and regions at ground potential.

The particle removal system and method disclosed herein is operable to remove undesirable particles from an interrupter prior to commercial use, e.g., prior to delivery to a customer. The system and method may also be used subsequent to initial commercial use by a customer to repair or perform maintenance/overhaul procedures prior to returning the unit to the field. In some forms, the particle removal system may be used for testing purposes such as by way of example and not limitation for design verification testing, cyclic endurance testing, or the like.

In some embodiments, the interrupter may be enclosed or partially enclosed in a volume. A vacuum or draw-down blower may be used to draw a fluid, such as air, for example, through the interrupter. The system may include a compressor or blower for pressurizing air or another fluid, and may include a de-ionizer for de-ionizing the fluid. The air and/or de-ionized air may be passed through the interrupter, through a plurality of nozzles. The nozzles may be positioned at or inserted through openings in the interrupter, such as pre-existing openings in the interrupter, e.g., safety or access panels or ports or interfaces with features or components that are decoupled with the interrupter at the time of the testing. The de-ionized air may be evacuated through any such opening defined in the interrupter. The de-ionized air may reduce or eliminate charges in some of the particles, reducing or eliminating an electrostatic attraction between the particles and surfaces on or in the interrupter, which may make the particles more likely to separate from the surfaces and be entrained into the flow of air passing through the interrupter during the break-in testing procedures.

In some embodiments, a motor or other actuator might actuate the interrupter contact mechanism while the air is flowing through portions of the system. This may free existing particles that are disposed in the interrupter. This procedure may also generate entrainment of an initial amount of break-in wear particles that may be removed during the break-in testing, which might otherwise be generated during operational use in the field. The motor and other electrical components may be controlled by an electronic controller. In some aspects, vibration and/or shock actuators may be employed to aid in removing particles. The vibration may cause the particle to break loose from a resting position and become entrained in an air flow stream. The entrained particles may then be captured in a filter or with other types of separator systems located downstream of the interrupter.

In some embodiments, a particle counter, e.g., an optical or laser particle counter may be used to count or otherwise determine the amount of particles exiting the component during the particle extraction, which may be used to determine or control the duration of the break-in testing, e.g., based on an amount of particles removed, an achieved particle removal rate or reduction in particle removal rate, or other particle count/rate based parameter. In some embodiments, the system may be constructed to perform testing on multiple interrupters simultaneously.

Figure 2:
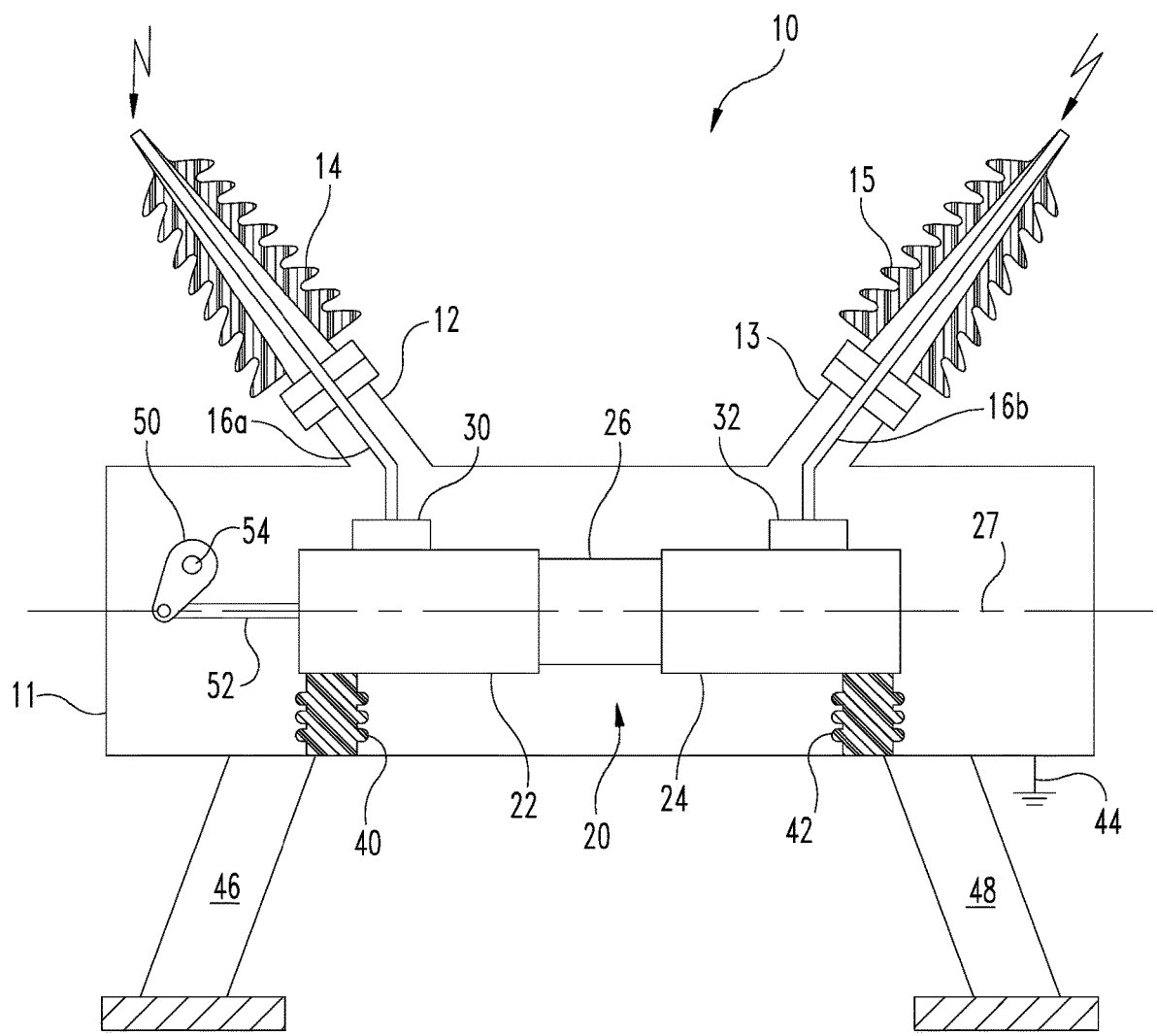
FIG. 2 is cross-sectional view of an electrical interrupter according to one embodiment of the present disclosure.

Referring now to FIG. 2, the exemplary interrupter system 10 is shown in cross-sectional form. The interrupter system 10 includes a housing 11 with a first boss 12 and a second boss 13 extending therefrom. A first insulator member 14 can be positioned about the first boss 12 and a second insulator member 15 can be positioned about the second boss 13. A first electrical conduit 16a extends through the first boss 12 and is electrically connected to an electrical interrupter 20. A second electrical conduit 16b extends through the second boss 13 and is also electrically connected to the electrical interrupter 20. The electrical interrupter 20 can include a first interrupter portion 22 in electrical communication with the first electrical conductor 16a and a second interrupter portion 24 in electrical communication with the second electrical conductor 16b. The first and second electrical conductors 16a, 16b can provide transmission means from a power source to a power consumer when electrically connected together via a third interrupter portion 26.

The third interrupter portion 26 can be moved or otherwise manipulated between a first position wherein the first and second portions 22, 24 are in electrical communication and a second position wherein the first and second portions 22, 24 are not in electrical communication with one another. The movement of the third portion 26 can include translational movement along a longitudinal direction defined along an axis 27, movement in a transverse direction relative to the axis 27, a rotational movement about the axis 27 or any combination thereof. In some forms the movement can be steady at a constant velocity and in other forms the movement can be unsteady, intermittent, and/or with various accelerations. In yet other forms movement of any portion of the interrupter 20 can include a vibration induced by an actuator system as will be described in further detail below.

The Interrupter 20 can be supported within the housing 11 by various means and in the exemplary embodiment first and second standoffs 40, 42 are used. In some forms the standoffs 40, 42 can be electrically conductive and in other forms the standoffs can be electrically isolated depending on the design characteristics of the interrupter 20 and the housing 11. The housing can be connected to ground via one or more conductive lines 44 and can be supported by one or more structures such as a first leg support 46 and a second leg support 48.

A lever arm 50 such as a bell crank or the like can be connected to a portion of the interrupter 20 such as the third interrupter portion 26 via a movable control rod 52 or the like. In one form the lever arm 50 can include a pivot 54 and can be operably connected to an actuation means such as a linear actuator or an electric motor or the like. The actuation means, not shown, causes the interrupter 20 to move between an electrically conductive position and an electrically isolated position as desired. In other embodiments, multiple control rods and/or multiple actuators may be employed in various locations throughout the interrupter 20.

Figure 3:
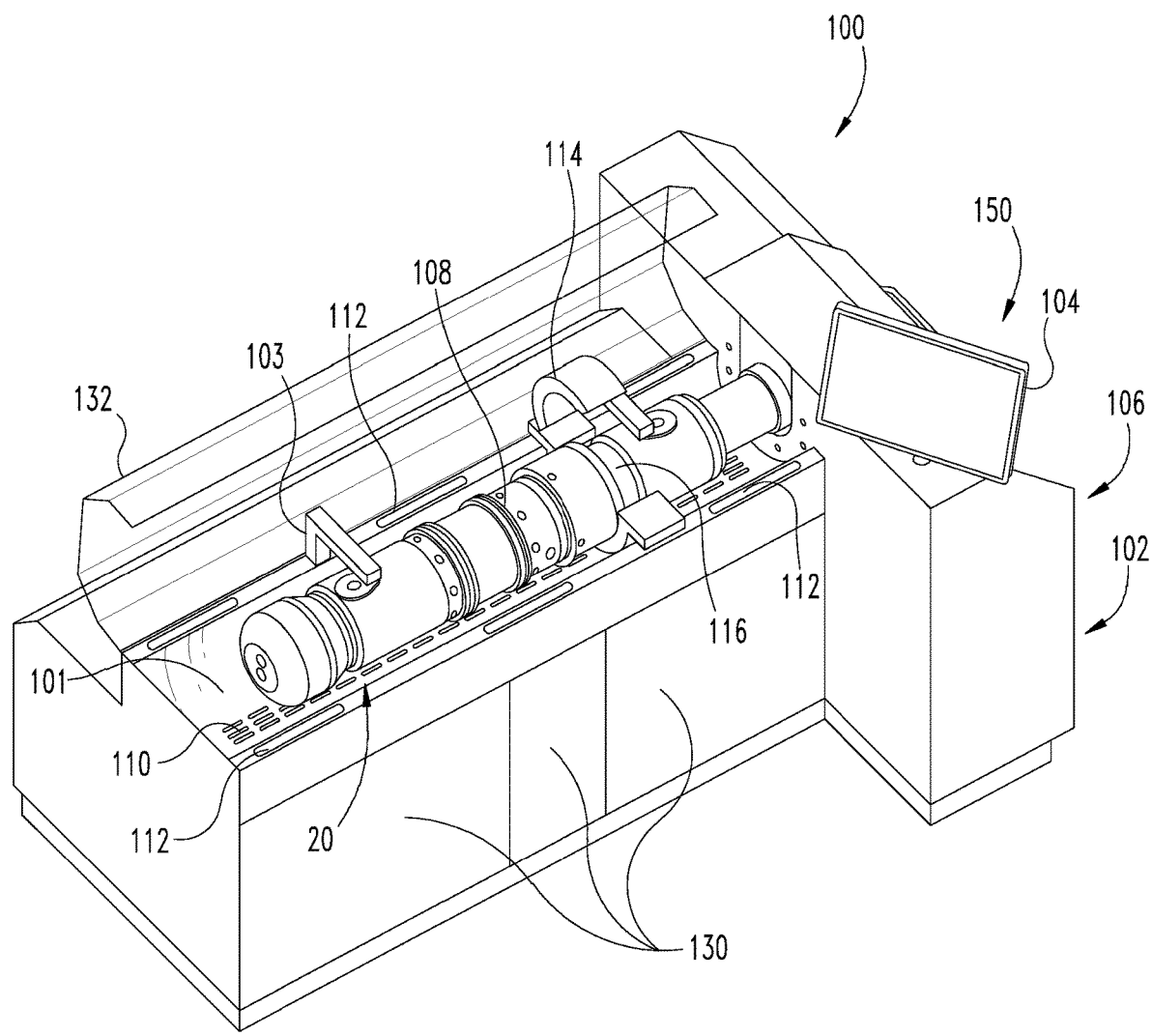
FIG. 3 is a perspective view of a portion of the electrical interrupter of FIG. 1 positioned in a particle separator system according to one embodiment of the present disclosure.
Figure 4A:
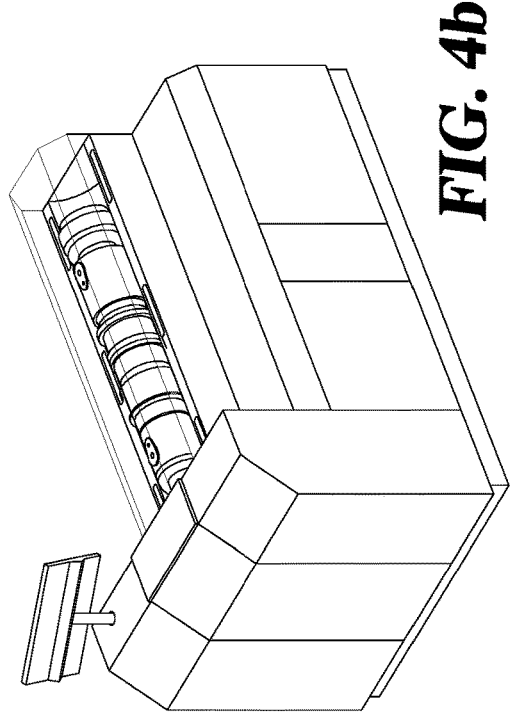
FIGS. 4a to 4d are perspective views of the particle separator system illustrated in FIG. 3.
Figure 4B:
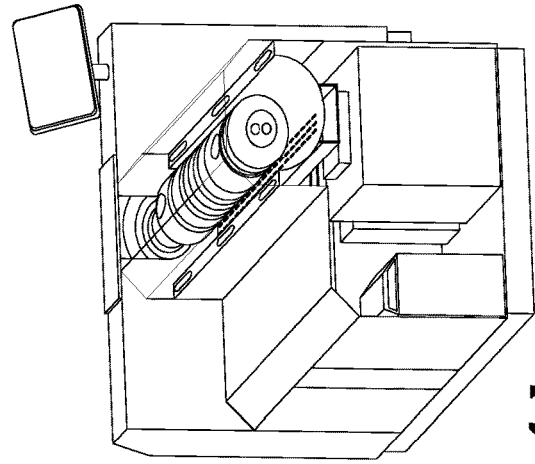
Figure 4C:
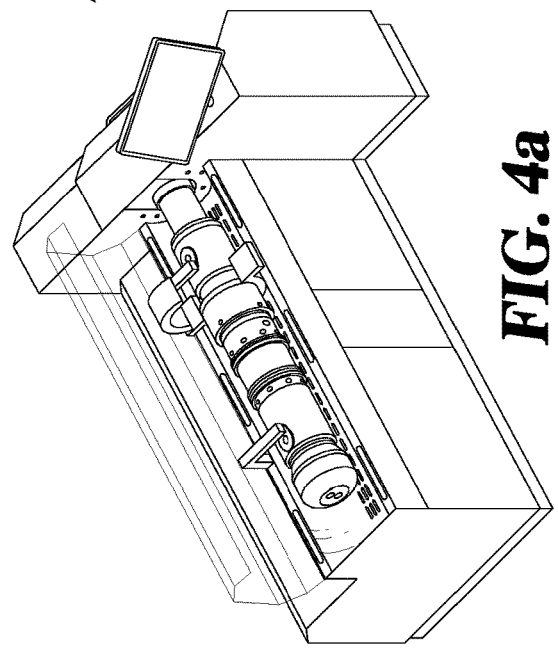
Figure 4D:
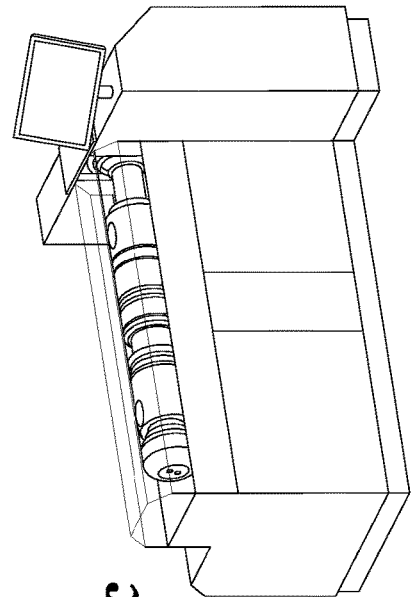

Referring now to FIG. 3, a particle extraction system 100 for an interrupter 20 as defined by one embodiment of the present disclosure is illustrated. The particle extraction system 100 can include a support bay 101 for holding the interrupter 20. One or more connector arms 103 can extend from the support bay 101 to engage with and hold the interrupter 20 in a fixed position. The connector arms 103 can be removably coupled to the interrupter 20 via mechanical means such threaded fasteners, slot and groove combinations, clamps or other means as known by those skilled in the art. The particle extraction system 100 can include a control system 102 with a monitor 104 having an input/output system 106 operably coupled to the control system 100.

Particles can be removed from the interrupter 20 through a plurality of locations. By way of example and not limitation, a particle egress port 108 may define one location for ejecting a particle from an internal region of the interrupter 20. As particles are removed from the interrupter 20, one or more vacuum slots 110 formed in the support bay 101 of the particle extraction system 100 may receive and remove said particles from the support bay 101. The vacuum slots 110 may be fluidly coupled to one or more return ducts 112. In one form a working fluid utilized to transport the particles from the support bay 101 can be air or de-ionized air; however other fluids may be used and are contemplated herein.

The particle extraction system 100 can also include a compressed air collar 114 operable for delivering compressed air or other fluid from a source (not shown) into one or more air inlet ports 116 located on the interrupter 20. The air inlet ports 116 can be in fluid communication with one or more internal flowpaths (not shown) of the interrupter 20 to help facilitate removal of the internal particles. The compressed air flow may entrain certain particles within the internal flowpaths and carry said particles out of the interrupter 20 through the egress port 108 or other locations defined by the system and then subsequently removed through the vacuum slots 110. A portion of the air can be returned through air return ducts 112 so that a flow of air is continuously circulating from the support bay 101 through the vacuum slots 110 and returned through the return ducts 112 after discharging the particles in a filter (not shown) or other particle removal device, such as an inertial particle separator.

The support bay 101 of the particle extraction system 100 may include one or more access panels 130 to provide access to internal actuators, gear systems, shaking or vibration means, pumps, filters, controllers, electronics, shock absorbers, duct works, particle measurement systems including laser systems, and other devices for operating the system 100. The support bay 101 may also include a hinged cover 132 to enclose the interrupter 20 during system operation. The hinged cover 132 can sealingly engage with the support bay 101 such that fluid will be restricted from flowing into the external region around the system 100 during operation. In one form the hinged cover and can be partially transparent to permit an operator to view the interrupter 20 during operation of the system. FIGS. 4a to 4d show various views of the particle extraction system 100.

Figure 5:
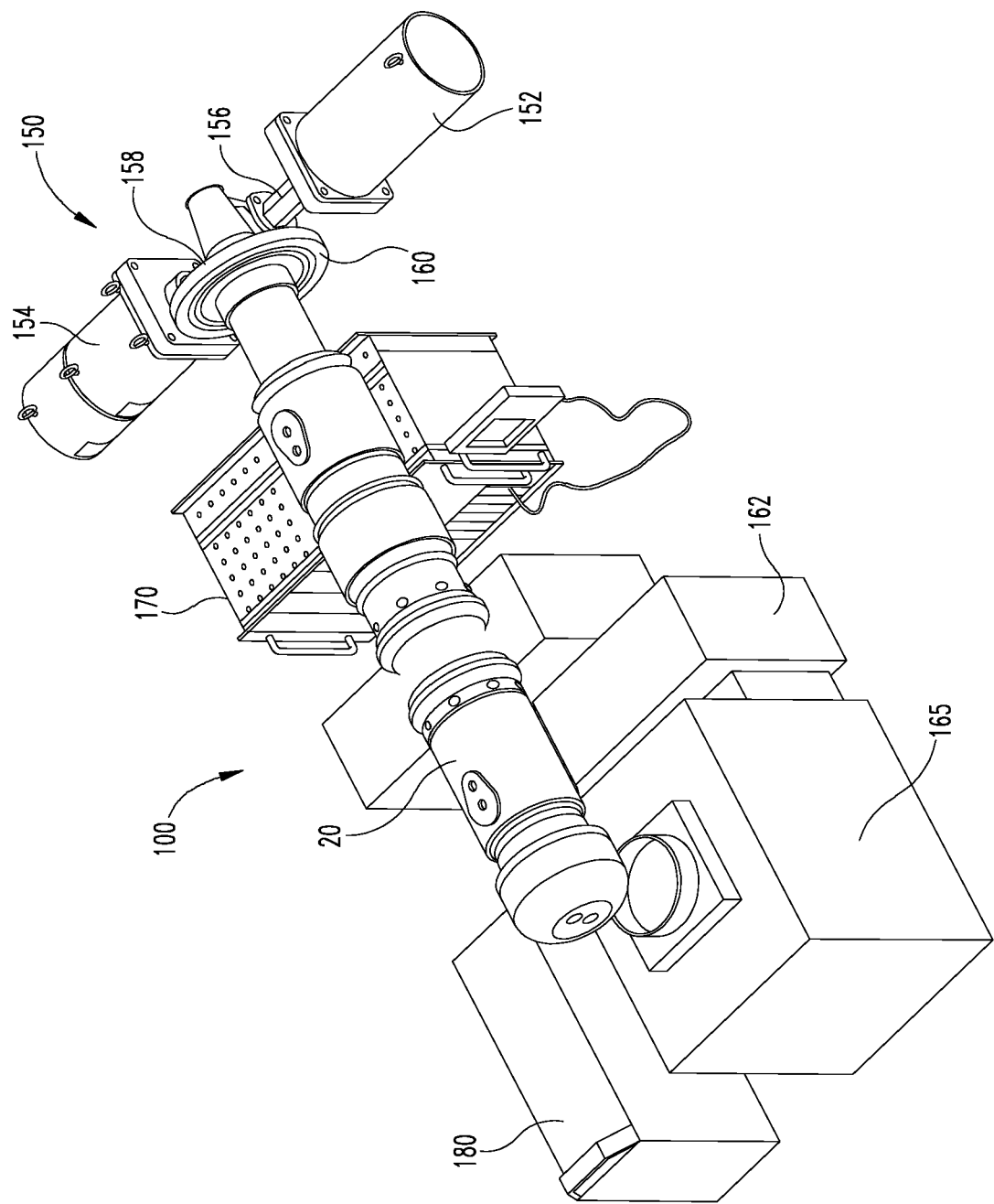
FIG. 5 is a perspective view of the particle separator system illustrated in FIG. 3 with a portion of the housing cut away to show certain internal features.
Figure 6A:
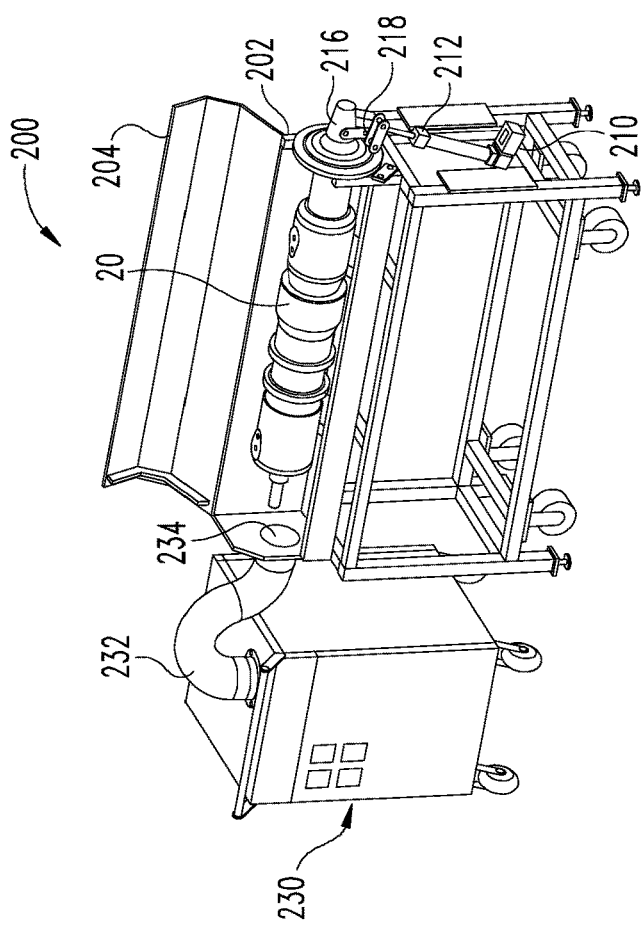
FIGS. 6a to 6d are perspective views of an electrical interrupter system according to another embodiment of the present disclosure.
Figure 6D:
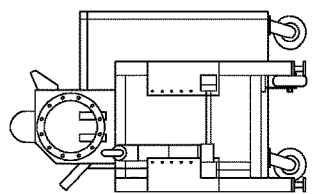
Figure 6B:
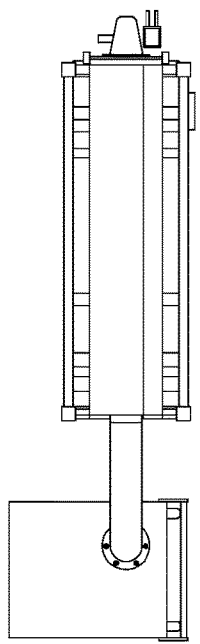
Figure 6C:
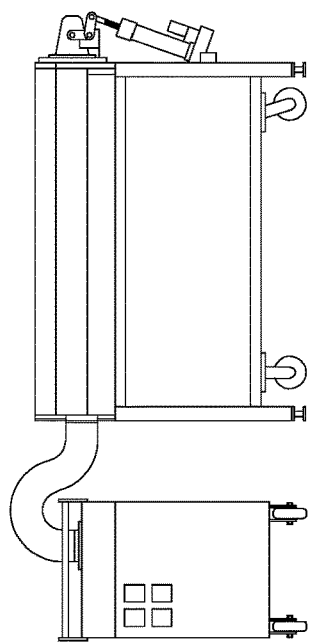

FIG. 5 shows portions of the particle extraction system 100 with the outer housing removed. In one form the actuator system 150 can include an electric motor as a motive source. In the disclosed embodiment, first and second electric motors 152, 154 are operably connected to an adaptor 160 via first and second shafts 156, 158 respectively. In some forms the first and second motors 152, 154 may be directly coupled to a bell crank (not shown) to operate a left, a right, or a center pole (also not shown) independently. The adaptor 160 can be connected to one or more lever arms such as the lever arm 50 (see FIG. 2) to permit the actuator system 150 to cycle portions of the interrupter 20 between the first and second positions so that particles can be displaced and removed from the interrupter 20. The adaptor 160 can include gears, shock absorbers, connector couplings and other features operable for cycling the interrupter in a desired fashion. A pump system 165 including a vacuum pump (not shown) and/or a compressor (not shown) can be operably coupled to the vacuum slots 110 to provide suction or pressure flow to remove the displaced particles and to provide compressed air to the compressed air collar 114 (See FIG. 3). The pump system 160 may include one or more pumps or fluid compressors to provide a pressurized fluid flow and/or to draw a vacuum through portions of the particle extraction system 100.

A filter system 162 can be operably connected to the pump system 160 so as to remove and capture displaced particles from a fluid flow and prevent recirculation of the displaced particles. In one form the filter system can include an inertial particle separator device such as a vortex or cyclone type of device. The inertial particle separator is operable to separate displaced particles from fluid entrainment via inertial forces such as momentum and gravitational forces. In one form an inertial particle separator can include a vortex or cyclone operation. In another form the filter can include one or more filter devices. The filter devices may include any of various types of filter media. One example of a filter media is fiberglass media that is defined by layered fiberglass fibers to form the filter media. Another example of filter media may include a polyester pleated filter material which are similar to fiberglass filters, but typically have a higher resistance to airflow and a superior dust-stopping capability. Other examples include washable filters formed of a variety of materials known to those skilled in the art. In other forms the particle separator system can include inertial systems such as centripetal separators or cyclonic devices to remove particles from the fluid system.

The particle extraction system 100 can also include an electronic control system 170 which can include a central processing unit (CPU), memory, input/output systems, relays and other electronic systems for controlling the operation of the system 100. A particle measurement system 180 can also be implemented with the pump system 165 so that the system 100 can determine the particle removal rate. The control system 170 can be programmed to shut the system 100 down after the particle removal rate falls below a predetermined threshold. The threshold limit may be empirically determined such that any remaining particles will not be able to cause undesirable arcing within the interrupter 20 during operation in the field.

FIGS. 6a to 6d illustrate perspective views of a particle extraction system 200 according to another embodiment of the present disclosure. The particle extraction system 200 can include a housing 202 with a removable or pivotable cover 204 that may be positioned over an interrupter 20 in the housing 202. A motive or actuation source 210 such as a motor or the like may be connected to a power transmission member 212 such as linear or rotational actuator. The power transmission member 212 may be operably connected to a lever arm (not shown) of the interrupter 20 through an adapter 216 with a connector arm 218. Other means of actuation connection to the lever arm of the interrupter 20 may also be employed as one skilled in the art would readily understand. In this manner the motive source 210 may cycle the interrupter to generate and release particles as described previously. A vacuum system 230 may be operably connected to the housing 202 through a vacuum conduit 232 that is connected to a housing outlet 234. In this manner, during system 200 operation, any particles that are displaced from the interrupter 20 may be discharged through the housing outlet 234 and retained in the vacuum system 230.

In operation a particle extraction system can remove or extract particles prior to final product assembly and/or during a break-in period. Furthermore the particle extraction system may provide a quantitative measurement to assess the product cleanliness through correlation with a cleanliness level. The particle extraction system may use low and/or high pressure de-ionized air (or other fluid medium) flow, filtration system and a control system to operate an interrupter in a simulated operating conditions. In some forms, the particle extraction system may use shock and vibration inputs into the interrupter to facilitate particle extraction. Low pressure and high flow vacuum systems with filters, inertial separators and a de-ionizer system may collect the particles from the extraction chamber. In this manner, the particle extraction system may provide interrupters that have reduced failure rates and increased service life over similar interrupters not having been processed with the particle extraction system.

In one aspect the present disclosure includes a particle extraction system comprising: a support bay configured to hold an electrical interrupter; an actuator system operable for cycling the electrical interrupter to release particles; a fluid source in fluid communication with internal flowpaths formed within the interrupter, wherein flowing fluid from the fluid source is operable to entrain released particles therewith; and a vacuum slot operable for receiving the flowing fluid and the entrained particles egressed from the interrupter.

In refining aspects the particle extraction includes an electrical actuator operable for actuating a movable portion of the electrical interrupter between first and second positions; wherein the electrical actuator includes an electric motor; wherein the electrical actuator includes a second electric motor; an adaptor connected to the electric actuator; a rotatable shaft operably connected to the adaptor; a reciprocating rod connected between the adaptor and the movable portion of the electrical interrupter; an electronic controller operable for controlling the actuation system; wherein foreign particles are dislodged within the electrical interrupter when the movable portion is actuated between the first and second positions; wherein the actuation system is operable for independently actuating a plurality of movable elements within the electrical interrupter; a fluid pumping system in fluid communication with the fluid source; wherein the fluid pumping system is configured to produce a compressed fluid flow and/or produce a vacuum within the support; a particle separator for removing particles from the fluid; and the particle separator includes at least one of a filter device and an inertial particle removal device.

Another aspect of the present disclosure includes a method comprising: cycling a component in an electrical interrupter between first and second positions; dislodging and releasing particles within the electrical interrupter during the cycling; entraining the released particles in a flowing fluid; discharging the flowing fluid and entrained particles from the electrical interrupter; separating the discharged particles from the flowing fluid; and capturing the discharged particles.

In refining aspects, the cycling includes operating an electronic actuator; the cycling includes rotating a shaft connected to the electric; the cycling includes moving a reciprocating rod in response to the rotating shaft; controlling the cycling and capturing with an electronic controller; the entraining includes flowing fluid through the electrical interrupter and a particle extraction system in fluid communication with a support bay; the separating and capturing includes at least one of a filter device and an inertial device; and the cycling includes moving a plurality of conducting elements within the electrical interrupter.

Another aspect of the present disclosure includes a particle extraction apparatus comprising: a particle dislodging apparatus operably connectable to an electrical interrupter; a particle removal apparatus operably connectable to the electrical interrupter; and an electronic control system operably connected to the particle dislodging apparatus and to the particle removal apparatus.

In refining aspects, the particle dislodging apparatus includes an actuation system for moving internal components of the electrical interrupter when installed in a support bay; the particle dislodging apparatus includes a compressed air collar connected between the support bay and the electrical interrupter; the particle removal apparatus includes at least one vacuum slot formed in the support bay; the particle removal apparatus includes at least one of a filter system and an inertial particle separator system is in fluid communication with the at least one vacuum slot in the support bay.

While the application has been illustrated and described in detail in the drawings and foregoing description, the same is to be considered as illustrative and not restrictive in character, it being understood that only the preferred embodiments have been shown and described and that all changes and modifications that come within the spirit of the applications are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A particle extraction system comprising:
   a support bay configured to hold an electrical interrupter;
   an actuator system operable for cycling the electrical interrupter to release particles;
   a fluid source in fluid communication with internal flow-paths formed within the electrical interrupter, wherein flowing fluid from the fluid source is operable to entrain released particles therewith; and
   a vacuum slot operable for receiving the flowing fluid and the entrained particles egressed from the electrical interrupter.

2. The particle extraction system of claim 1, wherein the vacuum slot is formed into the support bay.

3. The particle extraction system of claim 1, further comprising a plurality of vacuum slots that include the vacuum slot.

4. The particle extraction system of claim 3, wherein the plurality of vacuum slots are formed into the support bay.

5. The particle extraction system of claim 1, further comprising a vibration actuator that is configured to apply a vibration to the electrical interrupter to cause particles to be removed from the electrical interrupter.

6. The particle extraction system of claim 1, further comprising a particle counter that is configured to determine an amount of the entrained particles egressed from the interrupter,
   wherein controlling a duration of break-in testing is based on the amount of the entrained particles, a removal rate of the entrained particles and/or a reduction in the removal rate of the entrained particles.

7. A method comprising:
   cycling a component in an electrical interrupter between first and second positions;
   dislodging and releasing particles within the electrical interrupter during the cycling;
   entraining the released particles in a flowing fluid;
   discharging the flowing fluid and entrained particles from the electrical interrupter via a vacuum slot formed in a support bay;
   separating discharged particles from the flowing fluid; and
   capturing the discharged particles.

8. The method of claim 7, wherein the cycling includes operating an electronic actuator.

9. The method of claim 8, wherein the cycling includes rotating a shaft connected to the electronic actuator.

10. The method of claim 9, wherein the cycling includes moving a reciprocating rod in response to rotating the shaft.

11. The method of claim 7 further comprising controlling the cycling and capturing with an electronic controller.

12. The method of claim 7, wherein the entraining includes flowing fluid through the electrical interrupter and a particle extraction system in fluid communication with the support bay.

13. The method of claim 7, wherein the separating and capturing includes at least one of a filter device and an inertial device.

14. The method of claim 7 wherein the cycling includes moving a plurality of conducting elements within the electrical interrupter.

15. A particle extraction system, wherein a support bay is configured to hold a plurality of electrical interrupters that includes an electrical interrupter, wherein an actuator system is operable to cycle the plurality of electrical interrupters to release particles, wherein a fluid source is in fluid communication with internal flowpaths formed within the plurality of electrical interrupters, wherein flowing fluid from the fluid source is operable to entrain released particles therewith, and wherein a vacuum slot is operable to receive the flowing fluid and entrained particles egressed from the plurality of electrical interrupters.

* * * * *